(No Model.)

E. A. MALLORY.
MACHINE FOR SCALDING AND STICKING FUR TO FELT HAT BODIES.

No. 244,271. Patented July 12, 1881.

Attest:
C. Clarence Poole
J. C. Turner

Inventor:
Ezra A. Mallory
By his Atty

UNITED STATES PATENT OFFICE.

EZRA A. MALLORY, OF DANBURY, CONNECTICUT.

MACHINE FOR SCALDING AND STICKING FUR TO FELT HAT-BODIES.

SPECIFICATION forming part of Letters Patent No. 244,271, dated July 12, 1881.

Application filed April 19, 1881. (No model.)

*To all whom it may concern:*

Be it known that I, EZRA A. MALLORY, of Danbury, in the county of Fairfield and State of Connecticut, have invented a new and useful Improvement in Machines for Scalding and Sticking Fur to Felt Hat-Bodies, to produce a nap in the manufacture of hats; and I do hereby declare that the following is a full and exact description of the same.

The effect to be produced is that of felting the fur into the felt body by manipulation and rubbing; and the object of my invention is to accomplish this effect by mechanical means without risk of straining or rupturing the nap.

My invention therefore consists in a series of parallel rollers geared to be simultaneously rotated in the same direction, and arranged on a concave line transversely, so that the material to be treated may be held in the concave between said rollers in a basket.

That others may fully understand my invention, I will more fully describe it, having reference to the accompanying drawings, wherein—

Figure 1:
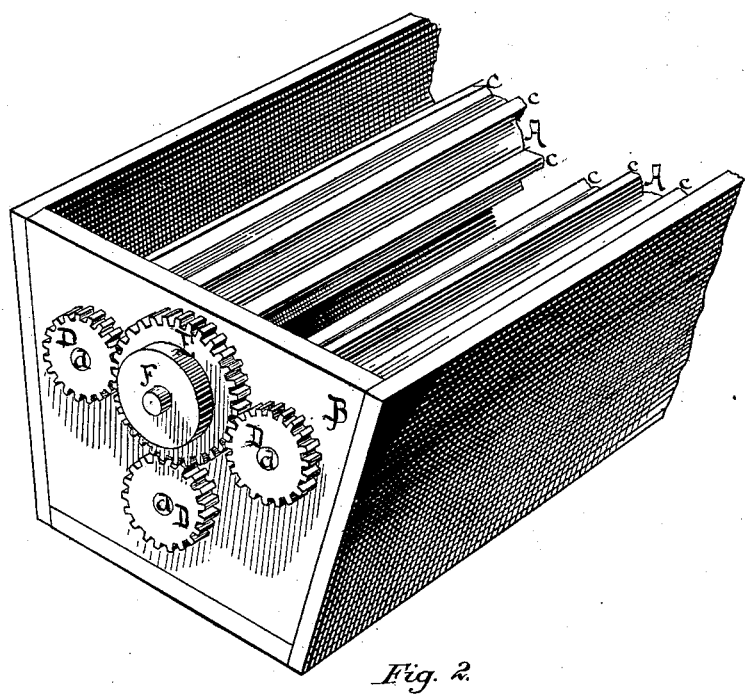
Figure 2:
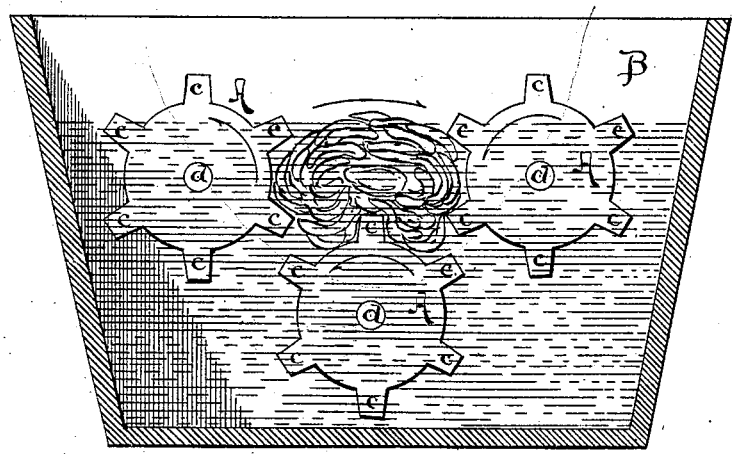

Figure 1 is a perspective view of my machine. Fig. 2 is a transverse section of the same.

The rollers or rubbers A A are provided with journal-bearings, supported in the vat or tub B, which, when in use, is partly filled with scalding water. The rollers A A are provided with longitudinal grooves or ribs c, whereby the surface of said roller forms transversely a series of elevations and depressions, which, coming successively in contact with the felt and fur, subjects them to a series of rubbings, whereby the fur or nap is rubbed and scalded into the felt body. The concave form of the receptacle prevents the material being carried over the edge, but causes it to be tumbled over and over with a rotary movement, which may be continued indefinitely, or until the sticking and scalding has been completed. The journals d of said rollers may have their bearings within the tub B; but I prefer to pass the journals at one end through the side of said tub and pack the apertures through which they pass. The gear-wheels or pinions D are placed on the protruded ends of said journals, respectively, and their several rollers being arranged on a curved line transversely, the gear-wheel E is located at the axis of said line, and is of proper size to mesh with all of said pinions, so that as said wheel E is rotated all of said pinions and their rollers will be simultaneously rotated and in the same direction.

The rollers A may be fluted or otherwise formed to present a series of longitudinal elevations and depressions, whereby the felts may be rubbed and manipulated as described.

The pulley F on the journal of the wheel E may be employed to transmit power to said wheel E; or some other description of gearing may be substituted, if more convenient.

Having described my invention, what I claim as new is—

1. A scalding and sticking machine consisting of a vat or tub to contain scalding-water, and inclosed within said tub, so as to be wholly or partly submerged in the water, a series of ribbed or fluted rollers arranged on a curved line transversely, so as to form an open-topped receptacle with a moving bottom, substantially as described, combined with suitable mechanism whereby a rotary movement may be imparted to said rollers simultaneously and in the same direction, for the purpose set forth.

2. The vat or tub B and the ribbed or fluted rollers A A, arranged in a circular curve transversely, combined with the pinions D D, attached to said rollers respectively, and in mesh with said pinions a driving gear-wheel, E, common to them all, substantially as set forth.

3. The method herein described of scalding and sticking naps to hat-bodies, which consists in gently rolling and manipulating the same in scalding-water on open rollers without superimposed pressure, substantially as described.

EZRA A. MALLORY.

In presence of—
LYMAN PLATT,
NORMAN HODGE.